(12) United States Patent
Choi

(10) Patent No.: US 6,748,750 B2
(45) Date of Patent: Jun. 15, 2004

(54) HYBRID AIR-CONDITIONING SYSTEM AND METHOD THEREOF FOR HYBRID ELECTRIC VEHICLE

(75) Inventor: Kwang-Yong Choi, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/331,227

(22) Filed: Dec. 30, 2002

(65) Prior Publication Data

US 2003/0233840 A1 Dec. 25, 2003

(30) Foreign Application Priority Data

Jun. 25, 2002 (KR) ................. 10-2002-0035654

(51) Int. Cl.$^7$ ................................................. F25B 1/00
(52) U.S. Cl. .......................................... 62/115; 62/236
(58) Field of Search .................. 62/239, 244, 236; 165/42, 43

(56) References Cited

U.S. PATENT DOCUMENTS

| 3,885,398 A | * | 5/1975 | Dawkins ........................ 62/89 |
| 3,984,224 A | * | 10/1976 | Dawkins ........................ 62/89 |
| 4,051,691 A | * | 10/1977 | Dawkins ........................ 62/236 |
| 6,301,909 B1 | * | 10/2001 | Hayasaka ........................ 62/175 |
| 6,362,580 B1 | * | 3/2002 | Omata et al. .................... 318/139 |
| 6,415,620 B1 | * | 7/2002 | Ferdows ........................ 62/244 |
| 6,543,243 B2 | * | 4/2003 | Mohrmann et al. ............ 62/230 |
| 2003/0108434 A1 | * | 6/2003 | Mohrmann | |

FOREIGN PATENT DOCUMENTS

JP 2003136951 a * 5/2003

* cited by examiner

Primary Examiner—William E. Tapolcai
Assistant Examiner—Mohammad M. Ali
(74) Attorney, Agent, or Firm—Morgan Lewis & Bockius LLP (57) ABSTRACT

The method for controlling a hybrid air conditioning system of a direct coupled motor-driven hybrid electric vehicle includes detecting operating conditions of the air conditioning system; and controlling the hybrid air conditioning system. The hybrid air conditioning system includes a mechanical air conditioner driven by an engine and an electric air conditioner driven by electric power of a battery.

15 Claims, 5 Drawing Sheets

HYBRID AIR-CONDITIONING SYSTEM AND METHOD THEREOF FOR HYBRID ELECTRIC VEHICLE

FIELD OF THE INVENTION

The present invention relates to a direct coupled motor-driven vehicle, and in particular, to an air-conditioning system and method for a direct coupled motor-driven hybrid electric vehicle.

BACKGROUND OF THE INVENTION

Typically, a direct coupled motor-driven vehicle has a powertrain system such that a motor is interconnected between an engine and a transmission. This motor is used for starting and driving the vehicle, and as a generator.

Conventional parallel hybrid electric vehicles and direct coupled type 42V vehicles typically utilize conventional air conditioning systems. Such conventional air conditioning systems require torque from the engine to operate. Therefore, when the air conditioning system is activated, the engine must be running. This is inefficient. Also, when the engine rpm is low in a vehicle equipped with a conventional air conditioning system, the rpm of the compressor is also low, thereby degrading the cooling performance of the air conditioning system. Furthermore, in conventional air conditioning systems, the compressor uses engine torque such that the operating performance of the vehicle is degraded, particularly when accelerating or when the vehicle is driving up an incline.

SUMMARY OF THE INVENTION

In a preferred embodiment of the present invention, the method for controlling a hybrid air conditioning system of a direct coupled motor driven hybrid electric vehicle comprises: detecting operating conditions of the hybrid air conditioning system and controlling the hybrid air conditioning system. The hybrid air conditioning system includes a mechanical air conditioner driven by an engine and an electric air conditioner driven by electric power of a battery.

It is preferable that detecting operating conditions of the air conditioning system includes: detecting an on/off state of an air conditioning system switch; calculating a temperature difference between a detected interior temperature and a target temperature if the air conditioning system switch is on; and detecting operating condition of the vehicle. Preferably, the detecting an operating condition of the vehicle includes determining whether or not the engine is in an idle stop state and determining whether or not a state-of-charge of a battery is greater than a predetermined value when the engine is in the idle stop state. The controlling the air conditioning system includes stopping operation of the mechanical air conditioner when the state-of-charge of the battery is greater than a predetermined value and starting operation of the electric air conditioner when a refrigerant temperature in an evaporator of the electric air conditioner is greater than a predetermined temperature.

It is further preferable that the detecting an operating condition of the vehicle includes: determining whether or not the engine is in an idle stop state; determining whether or not a state-of-charge of a battery is greater than a predetermined value when the engine is in the idle stop state; and restarting the engine when the state-of-charge of the battery is below the predetermined value. The controlling the air conditioning system includes: stopping operation of the mechanical air conditioner when the vehicle suddenly accelerates and starting operation of the electric air conditioner when a refrigerant temperature in an evaporator of the electric air conditioner is greater than a predetermined temperature.

Preferably, the detecting an operating condition of the vehicle includes: determining whether or not the engine is in a state of idle stop; and determining whether or not the vehicle is suddenly accelerating, when the engine is not in the idle stop state. The controlling the air conditioning system includes: stopping operation of a mechanical air conditioner and starting operation of the electric air conditioner if a refrigerant temperature in an evaporator of the electric air conditioner is greater than a predetermined temperature, when the vehicle suddenly accelerates.

It is further preferable that the detecting an operating condition of the vehicle includes: determining whether or not the engine is in an idle stop state; and determining whether or not the vehicle suddenly accelerates, when the engine is not in the state of idle stop. The controlling the air conditioning system includes: starting operation of the mechanical air conditioner when a refrigerant temperature in an evaporator of the mechanical air conditioner is greater than a predetermined temperature, and starting operation of the electrical air conditioner when a refrigerant temperature in an evaporator of the electric air conditioner is greater than a predetermined temperature, in the case that the vehicle is not suddenly accelerating.

Preferably, the detecting an operating condition of the vehicle includes: determining whether or not the engine is in an idle stop state; and determining whether or not a state-of-charge of a battery is greater than a predetermined value when the engine is in the idle stop state; restarting the engine when the state-of-charge of the battery is below the predetermined value; and determining whether or not the vehicle is suddenly accelerating when the engine is restarted. The controlling the air conditioning system includes: starting operation of the mechanical air conditioner when a refrigerant temperature in an evaporator of the mechanical air conditioner is greater than a predetermined temperature and starting operation of the electrical air conditioner when a refrigerant temperature in an evaporator of the electric air conditioner is greater than a predetermined temperature, in a case that the vehicle is suddenly accelerating.

In another preferred embodiment of the present invention, the hybrid air conditioning system of a direct coupled motor driven hybrid electric vehicle includes an operating condition detector, an electric air conditioner, a mechanical air conditioner, and a control unit. The operating condition detector detects at least one operating condition of the hybrid air conditioning system. The electric air conditioner is driven by electric power of a battery, and the mechanical air conditioner is driven by an engine. The control unit controls the hybrid air conditioning system based on the operating condition inputted from the operating condition detector.

It is preferable that the operating condition detector includes an air conditioning system switch, an interior temperature detector, an engine rpm detector, a battery status detector, a first evaporator refrigerant temperature detector, and a second evaporator refrigerant temperature detector. The air conditioning system switch turns the hybrid air conditioning unit on and off. The interior temperature detector detects temperature inside the vehicle. The engine rpm detector detects engine rpm. The battery status detector detects state-of-charge (SOC) of the battery. The first evaporator refrigerant temperature detector detects refrigerant temperature in an evaporator of the mechanical air conditioner. The second evaporator refrigerant temperature detector detects refrigerant temperature in an evaporator of the electrical air conditioner.

It is further preferable that the mechanical air conditioner includes a mechanical compressor, a condenser, an expansion valve, an evaporator, and a blower unit. The mechanical compressor compresses the refrigerant using mechanical power from the engine. The condenser condenses the refrigerant from the mechanical compressor by radiating heat of the refrigerant. The expansion valve expands the refrigerant from the condenser. The evaporator vaporizes the refrigerant by absorbing heat from outside. The blower unit blows air refrigerated around the evaporator into target space.

It is also preferable that the electric air conditioner includes an electrical compressor, a condenser, an expansion valve, an evaporator, and a blower unit. The electrical compressor compresses the refrigerant using electric power of a battery. The condenser condenses the refrigerant from the electrical compressor by radiating heat of the refrigerant. The expansion valve expands the refrigerant from the condenser. The evaporator vaporizes the refrigerant by absorbing heat from outside. The blower unit blows air refrigerated around the evaporator into a target space.

BRIEF DESCRIPTION OF THE DRAWINGS

The accompanying drawings, which are incorporated in and constitute a part of the specification, illustrate an embodiment of the invention, and, together with the description, serve to explain the principles of the invention, where.

DETAILED DESCRIPTION OF THE INVENTION

A preferred embodiment of the present invention will be described hereinafter with reference to the accompanying drawings. In the following detailed description, only the preferred embodiment of the invention has been shown and described, simply by way of illustration of the best mode contemplated by the inventor of carrying out the invention. As will be realized, the invention is capable of modification in various obvious respects without departing from the invention, and accordingly, all drawings and description are to be regarded as illustrative in nature, and not restrictive.

Figure 1:
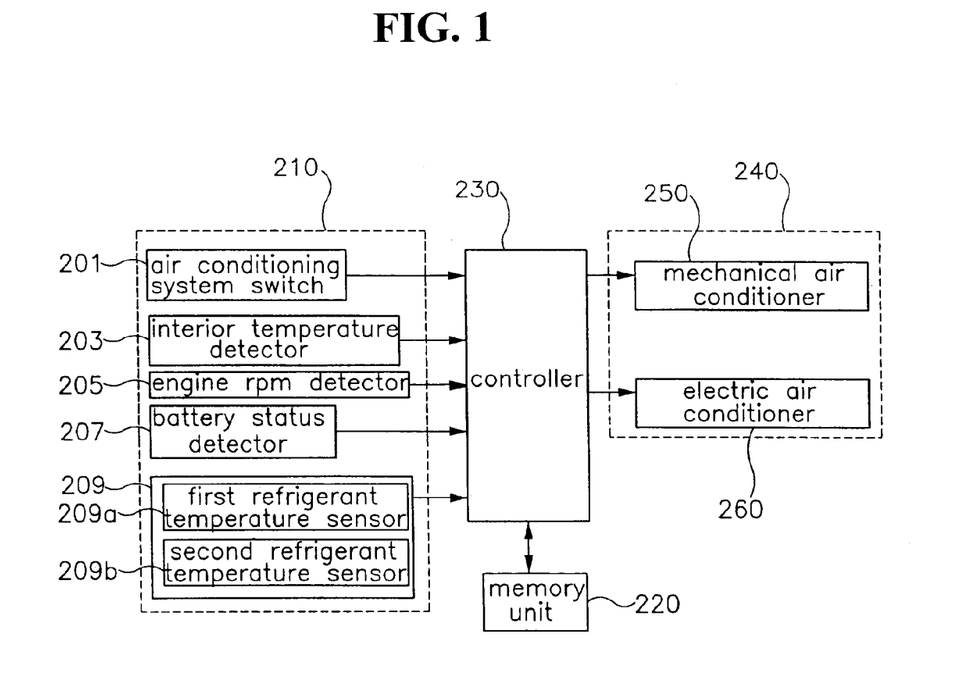
FIG. 1 is a block diagram illustrating a hybrid air conditioning system of a direct coupled motor driven vehicle according to a preferred embodiment of the present invention.

An air conditioning system for a direct coupled motor-driven hybrid electric vehicle according to a preferred embodiment of the present invention will now be described with reference to FIG. 1 and FIG. 2. The air conditioning system includes an operating condition detection unit 210, a memory unit 220, a controller 230, and a hybrid air conditioning unit 240. The operating condition detection unit 210 detects the operating conditions of the air conditioning system of the vehicle. The operating condition detection unit 210 includes an air conditioning system switch 201 for turning the hybrid air conditioning unit 240 on and off; an interior temperature detector 203 for detecting temperature inside the vehicle; an engine rpm detector 205 for detecting engine rpm of the vehicle; a battery status detector 207 for detecting a state of charge (SOC) of a battery 280; and a refrigerant temperature detector 209 (a&b) for detecting the temperature of the refrigerant in an evaporator (not shown).

The memory unit 220 preferably includes a read only memory (ROM) and a random access memory (RAM) for storing data associated with the air conditioning system of the vehicle. The controller 230 includes a microprocessor for controlling the air conditioning system, that is, the controller 230 analyzes parameters received from the operating condition detection unit 210, and compares the analyzed data with the air conditioning system associated data previously stored in the memory unit 220 so as to generate control signals for controlling the air conditioning system 200. Even though the memory unit 220 is separately provided in the present invention, the memory unit 220 can be integrally implemented in the controller 230.

The controller 230 includes the microprocessor, a memory, and other related hardware and software so as to be programmed for performing the air conditioning method according to the preferred embodiment of the present invention to be described below. This hardware and software is apparent to those skilled in the art, and, therefore, it will not be described in detail.

The hybrid air conditioning unit 240 operates according to a control signal from the controller 230 so as to perform air conditioning within the vehicle. The hybrid air conditioning unit 240 includes a mechanical air conditioner 250 for performing air conditioning using engine torque of the vehicle, and an electric air conditioner 260 for performing air conditioning using electric power from the battery 280.

Figure 2:
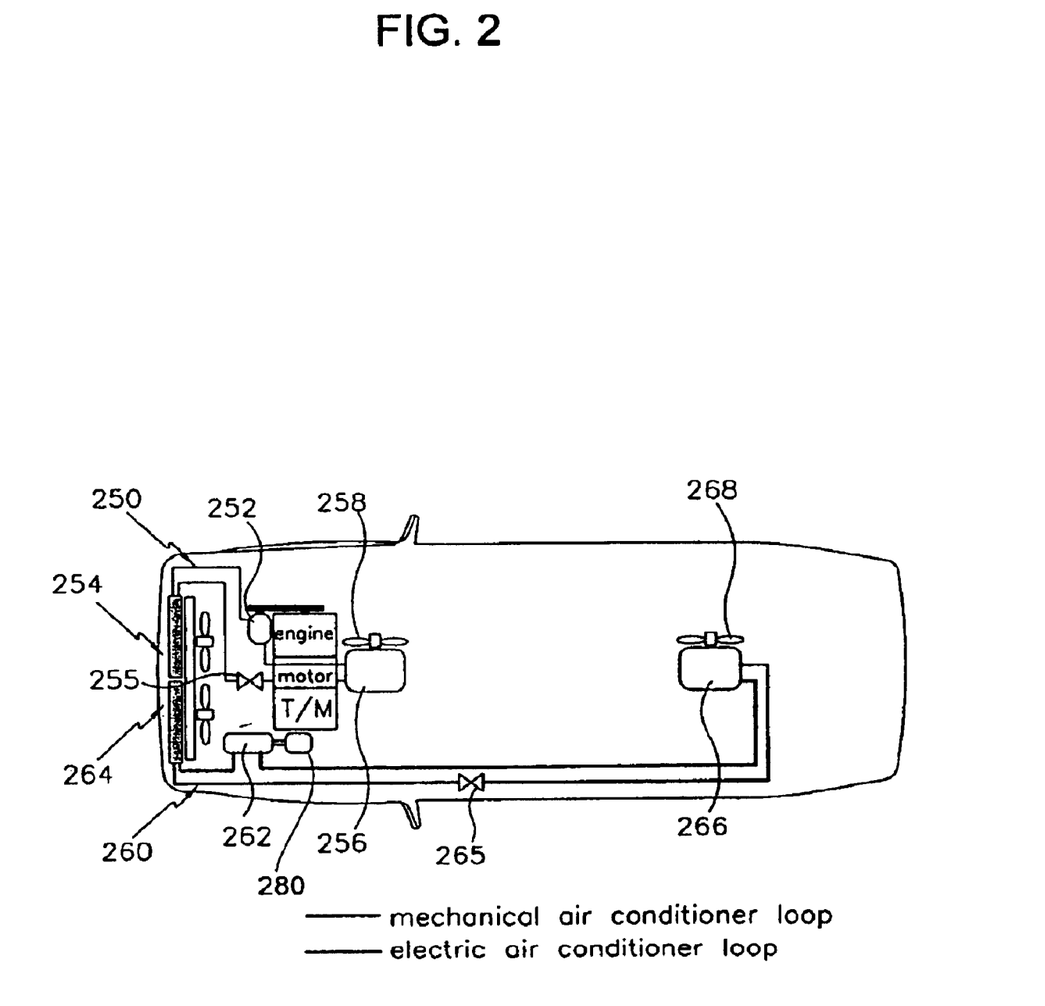
FIG. 2 is a schematic view illustrating an air conditioning system adopted to a direct coupled motor driven vehicle according to the preferred embodiment of the present invention.
Figure 3:
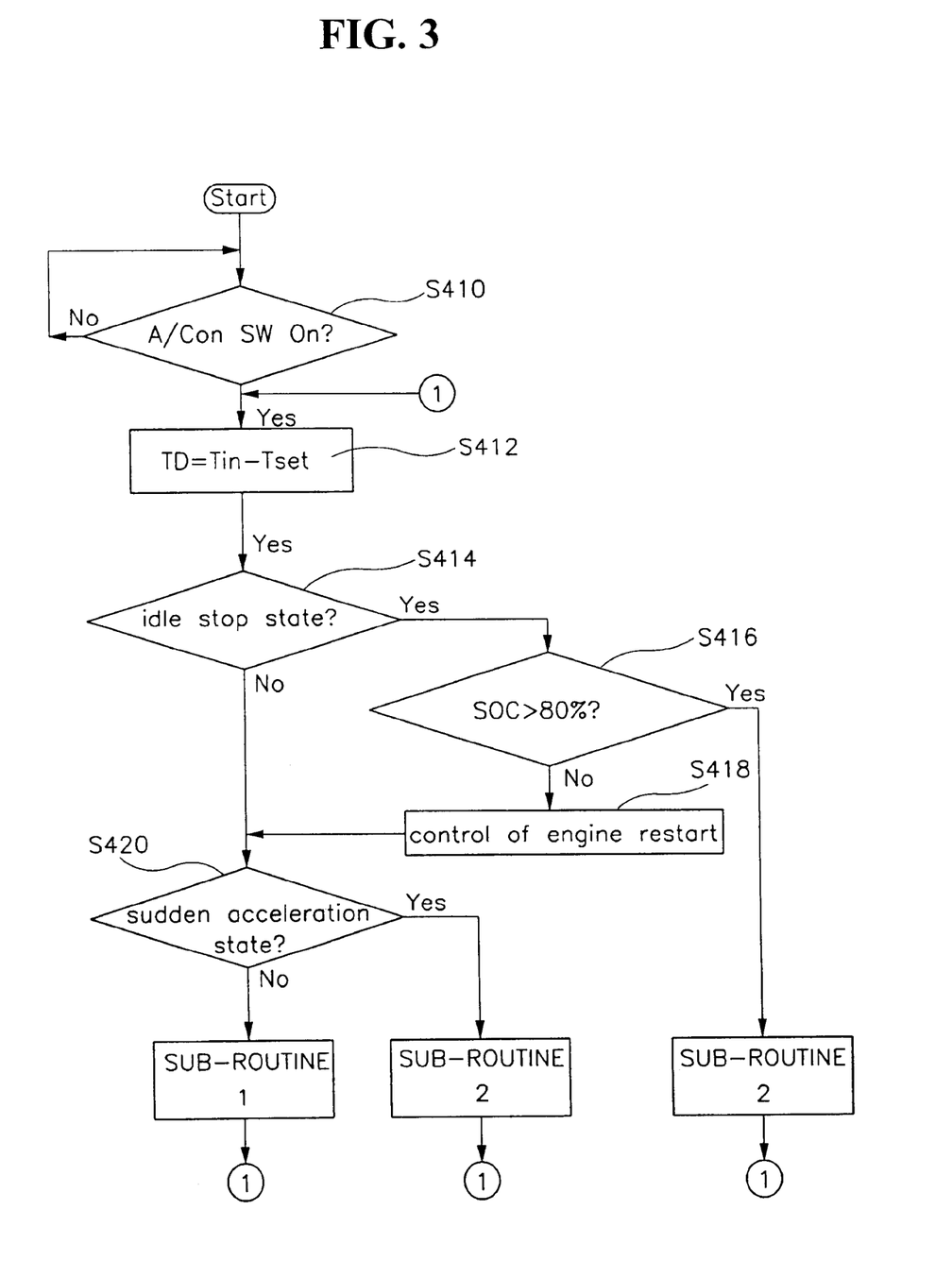
FIG. 3 to FIG. 5 are flowcharts illustrating a method for controlling the hybrid air conditioning system of the direct coupled motor driven vehicle according to the preferred embodiment of the present invention.

As shown in FIG. 2, it is preferable that the mechanical air conditioner 250 is responsible for the front seats, with a first evaporator 256 and a first blower unit 258 installed at the front of the vehicle, and that the electric air conditioner 260 is responsible for the rear seats, with a second evaporator 266 and a second blower unit 268 installed at the rear of the vehicle. Accordingly, the hybrid air conditioning unit 240 according to the preferred embodiment of the present invention is appropriate for a luxury vehicle of which the rear seats are most highly regarded.

The mechanical air conditioner 250 includes a mechanical compressor 252, a first condenser 254, a first expansion valve 255, a first evaporator 256, and a first blower unit 258. The mechanical compressor 252 is connected to the engine via a belt so as to compress low temperature low pressure refrigerant into high temperature high pressure refrigerant. That is, the mechanical compressor 252 compresses the refrigerant using the mechanical power of the engine.

The first condenser 254 condenses the high temperature high pressure gaseous refrigerant into a high temperature high pressure liquid refrigerant. That is, the first condenser 254 emits the heat of the refrigerant outside so as to condense the refrigerant. The first expansion valve 255 expands the high temperature high pressure liquid refrigerant into the low pressure liquid refrigerant. The first evaporator 256 converts the low pressure liquid refrigerant from the first expansion valve 255 into the low pressure gaseous refrigerant. That is, the refrigerant is evaporated by absorbing heat around the first evaporator 256. The first blower unit 258 blows the air refrigerated around the first evaporator 256 to a preset target space preset in the vehicle.

The electric air conditioner 260 includes an electric compressor 262, a second condenser 264, a second expansion valve 265, a second evaporator 266, and a second blower 3 unit 268. The electric compressor 262 operates using electric power provided from the battery 280 of the vehicle so as to compress the low temperature low pressure gaseous refrigerant into the high temperature high pressure gaseous refrigerant. That is, the electric compressor 262 compresses the refrigerant using electric power from the battery 280.

The second condenser 264 condenses the high temperature high pressure gaseous refrigerant from the electric compressor 262 into the high temperature high pressure liquid refrigerant. That is, the second condenser 264 dissipates the heat of the refrigerant outside so as to condense the refrigerant. The second expansion valve 265 expands the high temperature high pressure liquid refrigerant fed from the second condenser 264 into the low pressure liquid refrigerant. The second evaporator 266 converts the lower pressure liquid refrigerant from the second expansion valve 265 into the low pressure gaseous refrigerant. That is, the refrigerant is evaporated by absorbing heat around the second evaporator 266. The second blower unit 268 blows the air refrigerated around the second evaporator 266 to a preset target space preset in the vehicle.

Returning to FIG. 1, the refrigerant temperature detector 209 includes a first refrigerant temperature sensor 209a for sensing the temperature of the refrigerant in the first evaporator 256 and a second refrigerant temperature sensor 209b for sensing the temperature of the refrigerant in the second evaporator 266. The controller 230 analyzes the signals inputted from the operating condition detection unit 210 and generates control signals according to the driving conditions of the vehicle so as to transmit them to the hybrid air conditioning unit 240.

The controller 230 computes a difference (TD) between a present interior temperature (Tin) and the preset temperature (Tset) so as to determine an rpm of the electric compressor 262 based on the difference (TD).

Figure 4:
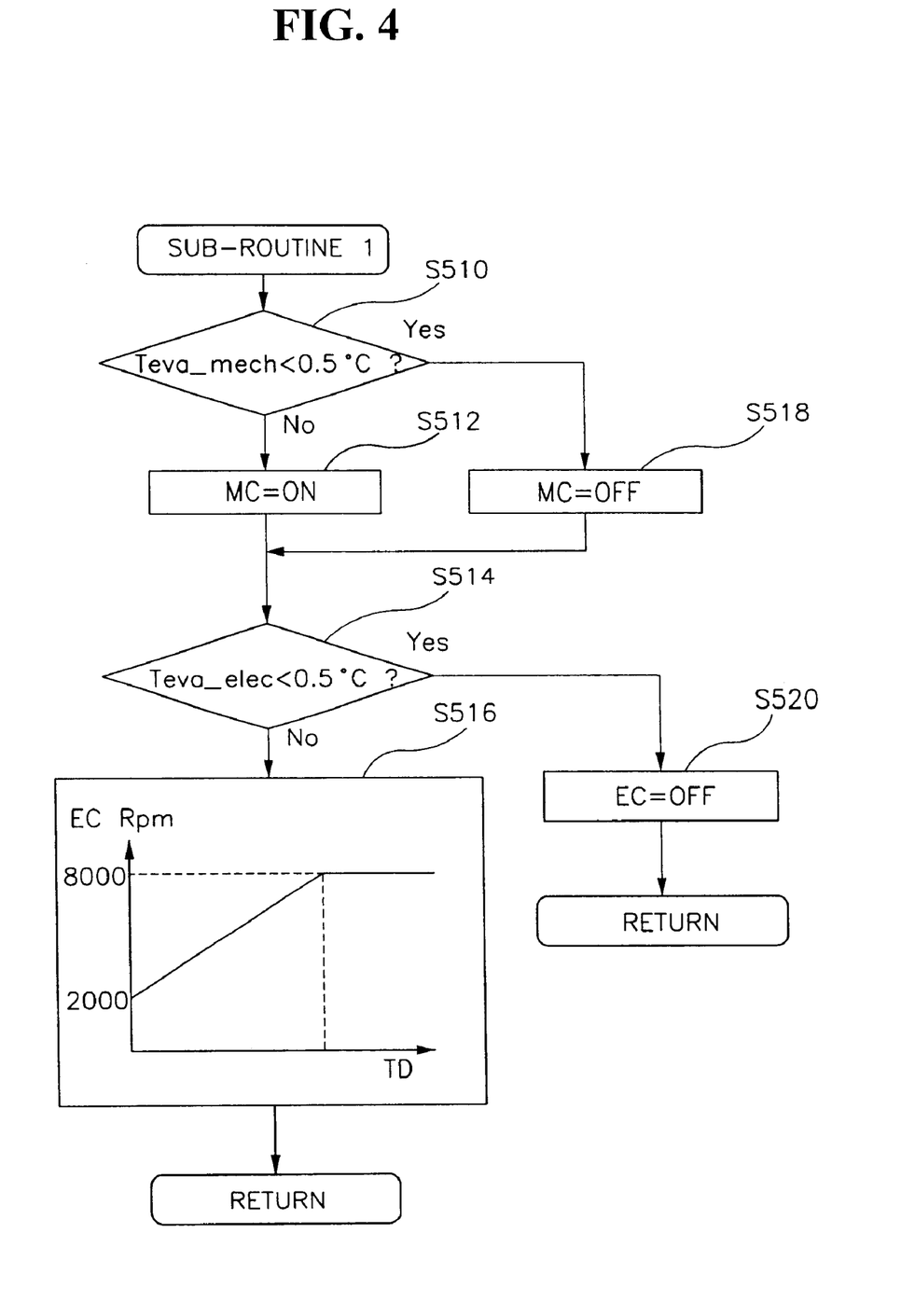

The hybrid air conditioning method according to the preferred embodiment of the present invention will be described hereinafter with reference to FIG. 1 to FIG. 5. As shown in FIG. 4, the controller 230 obtains parameters on the operating conditions from the operating condition detection unit 210 at steps S410 to S420. For example, the controller 230 determines whether the air conditioning system switch 210, which turns the hybrid air conditioning unit on and off, is on or off at step S410.

If the air conditioning system switch 201 is on, the controller 230 obtains the parameter of the interior temperature (Tin) of the vehicle using the interior temperature detector 203 at step S412. That is, if the air conditioning system switch 210 is turned on, the controller 230 computes the difference (TD) between the present interior temperature (Tin) of the vehicle and the desired temperature (Tset) set by the driver. The difference value (TD) computed at step S412 is used for determining the rpm of the electric compressor 262 when the electric compressor 262 operates.

The controller 230 then obtains the operating or running conditions of the vehicle from the engine rpm detector 205 at step S414. If it is determined that the vehicle is in the state of "idle stop" based on the engine rpm, the controller 230 gleans the state of charge (SOC) of the battery 280 from the battery status detector at step S416. The state of "idle stop" is when the engine is stopped because the engine is in an idle state for longer than a predetermined period, such as three seconds, in a direct coupled motor driven vehicle. The controller 230 determines whether or not the status of charge (SOC) is greater than a preset value (say 80%) at step S416.

If the SOC is greater than the preset value at step S416, the controller 230 operates the electric air conditioner 260, as per FIG. 6. On the other hand, if the SOC is below the preset value at step S416, the controller 230 enters an engine restart procedure at step S418.

If the engine is not in an "idle stop" state or if the engine restart procedure has been completed, the controller 230 determines whether or not the vehicle is in a sudden acceleration state at step S420. It is preferable that it is determined whether the vehicle is in a sudden acceleration state based on a throttle opening amount. In other words, the controller 230, determines that the vehicle is in the sudden acceleration state if the throttle opening amount is greater than a preset throttle opening amount.

If the vehicle is suddenly accelerating, at step S420, the controller 230 stops the operation of the mechanical air conditioner 250, according to the control procedure as shown in FIG. 6, at step S610, and starts operation of the electric air conditioner 260 according to the refrigerant temperature (Teva_elec) inputted from the second evaporator detector and the difference value (TD) at steps S612 to S616.

Figure 5:
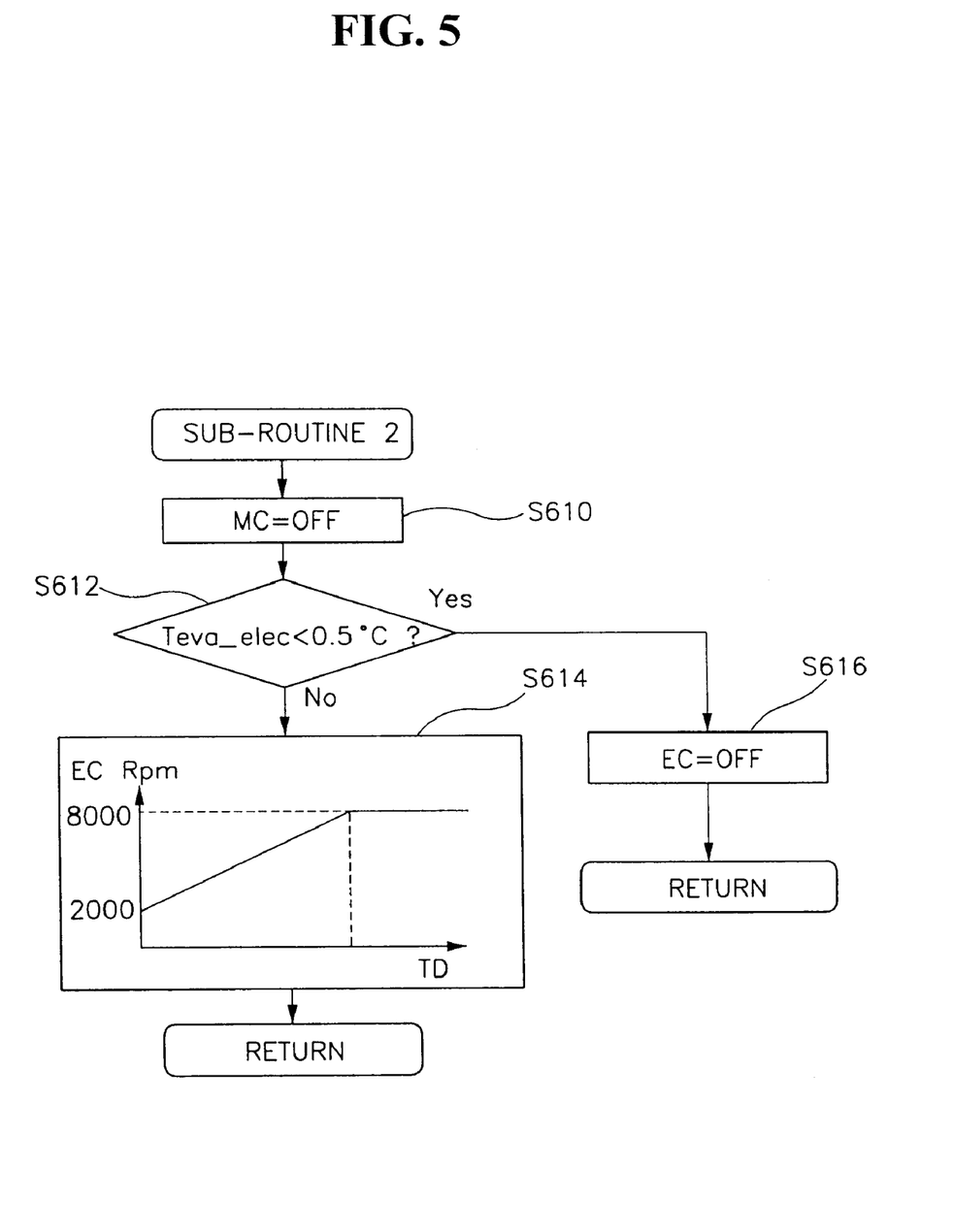

On the other hand, if the vehicle is not suddenly accelerating, at step S420, i.e., it is operating in a normal driving state, the controller 230 enters the procedure shown in FIG. 5, so as to control the mechanical air conditioner 250 according to the refrigerant temperature (Teva_mech) detected by the first refrigerant temperature detector.

Referring to FIG. 5, the controller 230 determines whether or not the refrigerant temperature (Teva_mech) detected by the first refrigerant temperature detector is greater than a preset temperature (0.5° C.), and generates a control signal and transmits the control signal to the mechanical conditioner 250 if the refrigerant temperature (Teva_mech) is greater than the preset temperature at step S512. On the other hand, if the refrigerant temperature (Teva_mech) in the first evaporator 256 is below the preset temperature (0.5° C.) at step S510, the controller 230 stops the operation of the mechanical air conditioner 250 at step S518.

If the mechanical air conditioner 250 is operated, the controller 230 controls the electric air conditioner 260 according to the refrigerant temperature (Teva_elec) of the second evaporator 266 detected by the second refrigerant temperature detector and the temperature difference (TD) at step S514. That is, while the mechanical air conditioner 250 operates, the control unit 230 generates a control signal so as to operate the electric air conditioner 260 if the refrigerant temperature (Teva_elec) of the second evaporator detected by the second refrigerant temperature detector is greater than the preset temperature (0.5° C.) at step S516. On the other hand, if the refrigerant temperature (Teva_elec) of the second evaporator is below the preset temperature (0.5° C.) at step S514, the controller 230 stops the operation of the electric air conditioner 260 at step S520.

As described above, the air conditioning system according to the preferred embodiment of the present invention is controlled by determining the rpm of the electric compressor 262 based on the difference value (TD) computed according to the interior temperature (Tin) of the vehicle and the driver's set temperature (Tset).

Also, if the vehicle is in the "idle stop" mode or the sudden acceleration mode, the air conditioning system is controlled such that the mechanical compressor 252 does not operate and the rpm of the electric compressor 262 increases such that the air conditioning performance is enhanced.

Also, the mechanical and electric compressors 252 and 262 are controlled to stop operation when the refrigerant temperatures in the first and second evaporators are below the preset temperature (0.5° C.) so that condensed water on the surface of the first and second evaporators 256 and 266 does not freeze.

As described above, in the hybrid air conditioning system and method of the direct coupled motor driven vehicle, the mechanical air conditioner stops operating and only the electric air conditioner operates while the vehicle is accelerating or driving up a slope such that the operating performance of the vehicle can be improved without degradation of the air conditioning performance. Also, even when the idle stop and go function is activated, which is a feature of the direct coupled motor driven vehicle, air conditioning can be performed.

Even though the compressor for the mechanical air conditioner does not operate when the engine stops, the air conditioning function can be maintained since the electric air conditioner operates. Furthermore, both the mechanical and electrical compressors operate for air conditioning of the vehicle, such that each compressor is only required to operate at half the capacity of a conventional compressor. Since the capacity of the mechanical compressor can be reduced by as much as half of the conventional one, it is possible to minimize the volume of the compressor to open added space in the engine compartment. Still further, the energy generated in braking the vehicle can be retrieved as electric energy by operating the direct coupled motor as a generator and the electric energy can be used for driving the electric compressor, resulting in a fuel mileage improvement.

In the case of a vehicle equipped with only a mechanical air conditioning system, as the engine rpm decreases, the rpm of the compressor also decreases such that the air conditioning performance is degraded. In the hybrid air conditioning system of the present invention, the electrical compressor compensates for the degradation of the mechanical compressor performance when the engine rpm is low or the engine is in the idle state, such that it is expected to maintain reliable air conditioning performance.

In the mechanical air conditioning system, the initial cooling down performance is not optimal, and it takes a long time to reduce the interior temperature of the vehicle to the target temperature. In a vehicle equipped with the hybrid air conditioning system of the present invention, it is possible to lower the interior temperature (Tin) to a target temperature by operating the electric compressor at a high rpm so as to improve the initial cooling performance.

Generally, in the case of a vehicle which is not equipped with an additional air conditioner for the rear seats, the rear temperature is higher than the front part of the vehicle. In a vehicle equipped with the hybrid air conditioning system of the present invention, it is possible to improve the rear air conditioning, and it is also possible to independently control the front and rear temperatures of the vehicle.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

Throughout this specification and the claims which follow, unless explicitly described to the contrary, the word "comprise" or variations such as "comprises" or "comprising" will be understood to imply the inclusion of stated elements but not the exclusion of any other elements.

What is claimed is:

1. A method for controlling a hybrid air conditioning system of a direct coupled motor driven hybrid electric vehicle, comprising:
   detecting operating conditions of the hybrid air conditioning system; and
   controlling the hybrid air conditioning system including a mechanical air conditioner driven by an engine and an electric air conditioner driven by electric power of a battery;
      wherein said detecting operating conditions of the air conditioning system includes detecting an on/off state of an air conditioning system switch;
         calculating a temperature difference between a detected interior temperature and a target temperature if the air conditioning system switch is on; and
         detecting an operating condition of the vehicle;
      wherein said detecting an operating condition of the vehicle includes determining whether or not the engine is in an idle stop state and determining whether or not a state-of-charge of a battery is greater than a predetermined value when the engine is in the idle stop state; and
      wherein said controlling the air conditioning system includes stopping operation of the mechanical air conditioner when the state-or-charge of the battery is greater than a predetermined value and starting operation of the electric air conditioner when a refrigerant temperature in an evaporator of the electric air conditioner is greater than a predetermined temperature.

2. A method for controlling a hybrid air conditioning system of a direct coupled motor driven hybrid electric vehicle, comprising:
   detecting operating conditions of the hybrid air conditioning system; and
   controlling the hybrid air conditioning system including a mechanical air conditioner driven by an engine and an electric air conditioner driven by electric power of a battery;
      wherein said detecting operating conditions of the air conditioning system includes detecting an on/off state of an air conditioning system switch;
         calculating a temperature difference between a detected interior temperature and a target temperature if the air conditioning system switch is on; and
         detecting an operating condition of the vehicle;
      wherein said detecting an operating condition of the vehicle includes:
         determining whether or not the engine is in an idle stop state;
         determining whether or not a state-of-charge of a battery is greater than a predetermined value when the engine is in the state of idle stop; and
         restarting the engine when the state-of-charge of the battery is below the predetermined value; and
      wherein said controlling the hybrid air conditioning system includes:
         stopping operation of the mechanical air conditioner when the vehicle suddenly accelerates and starting operation of the electric air conditioner when a refrigerant temperature in an evaporator of the electric air conditioner is greater than a predetermined temperature.

3. A method for controlling a hybrid air conditioning system of a direct coupled motor driven hybrid electric vehicle, comprising:
   detecting operating conditions of the hybrid air conditioning system; and
   controlling the hybrid air conditioning system including a mechanical air conditioner driven by an engine and an electric air conditioner driven by electric power of a battery;
     wherein said detecting operating conditions of the air conditioning system includes detecting an on/off state of an air conditioning system switch;
       calculating a temperature difference between a detected interior temperature and a target temperature if the air conditioning system switch is on; and
     detecting an operating condition of the vehicle; and
   wherein said detecting an operating condition of the vehicle includes:
     determining whether or not the engine is in an idle stop state; and
     determining whether or not the vehicle suddenly accelerates when the engine is not in the state of idle stop, and
   wherein said controlling the air conditioning system includes:
     stopping operation of a mechanical air conditioner and starting operation of the electric air conditioner if a refrigerant temperature in an evaporator of the electric air conditioner is greater than a predetermined temperature, when the vehicle is in the state of sudden acceleration.

4. A method for controlling a hybrid air conditioning system of a direct coupled motor driven hybrid electric vehicle, comprising:
   detecting operating conditions of the hybrid air conditioning system; and
   controlling the hybrid air conditioning system including a mechanical air conditioner driven by an engine and an electric air conditioner driven by electric power of a battery;
     wherein said detecting operating conditions of the air conditioning system includes detecting an on/off state of an air conditioning system switch;
       calculating a temperature difference between a detected interior temperature and a target temperature if the air conditioning system switch is on; and
     detecting an operating condition of the vehicle;
   wherein said detecting an operating condition of the vehicle includes:
     determining whether or not the engine is in a state of idle stop; and
     determining whether or not the vehicle suddenly accelerates when the engine is not in the state of idle stop, and
   wherein said controlling the hybrid air conditioning system includes:
     starting operation of the mechanical air conditioner when a refrigerant temperature in an evaporator of the mechanical air conditioner is greater than a predetermined temperature, and starting operation of the electrical air conditioner when a refrigerant temperature in an evaporator of the electric air conditioner is greater than a predetermined temperature, where the vehicle is not suddenly accelerating.

5. A method for controlling a hybrid air conditioning system of a direct coupled motor driven hybrid electric vehicle, comprising:
   detecting operating conditions of the hybrid air conditioning system; and
   controlling the hybrid air conditioning system including a mechanical air conditioner driven by an engine and an electric air conditioner driven by electric power of a battery;
     wherein said detecting operating condition of the air conditioning system includes detecting an on/off state of an air conditioning system switch;
       calculating a temperature difference between a detected interior temperature and a target temperature if the air conditioning system switch is on; and
     detecting an operating condition of the vehicle;
   wherein said detecting an operating condition of the vehicle includes:
     determining whether or not the engine is in the idle stop state; and
     determining whether or not a state-of-charge of a battery is greater than a predetermined value when the engine is in the idle stop state;
     restarting the engine when the state-of-charge of the battery is below the predetermined value; and
     determining whether or not the vehicle is suddenly accelerating when the engine is restarted, and
   wherein said controlling the hybrid air conditioning system includes:
     starting operation of the mechanical air conditioner when a refrigerant temperature in an evaporator of the mechanical air conditioner is greater than a predetermined temperature and starting operation of the electrical air conditioner when a refrigerant temperature in an evaporator of the electric air conditioner is greater than a predetermined temperature, where the vehicle is suddenly accelerating.

6. A hybrid air conditioning system of a direct coupled motor driven hybrid electric vehicle comprising:
   an operating condition detector for detecting at least one operating condition of the hybrid air conditioning system;
   an electric air conditioner driven by electric power of a battery, and a mechanical air conditioner driven by an engine; and
   a control unit for controlling the hybrid air conditioning system based on at least one operating condition inputted from the operating condition detector; and
   wherein the operating condition detector includes:
     an air conditioning system switch for turning the hybrid air conditioning unit on and off
     an interior temperature detector for detecting temperature inside the vehicle;
     an engine rpm detector for detecting engine rpm;
     a battery status detector for detecting state-of-charge (SOC) of the battery;
     a first evaporator refrigerant temperature detector for detecting refrigerant temperature in an evaporator of the mechanical air conditioner; and
     a second evaporator refrigerant temperature detector for detecting refrigerant temperature in an evaporator of the electrical air conditioner.

7. The hybrid air conditioning system of claim 6, wherein the mechanical air conditioner includes:
   a mechanical compressor for compressing refrigerant using mechanical power from the engine;
   a condenser for condensing the refrigerant from the mechanical compressor by radiating heat of the refrigerant;
   an expansion valve for expanding the refrigerant from the condenser;
   an evaporator for vaporizing the refrigerant by absorbing heat from outside of the vehicle; and
   a blower unit for blowing air refrigerated around the evaporator into a target space.

8. The hybrid air conditioning system of claim 6, wherein the electric air conditioner includes:
   an electrical compressor for compressing refrigerant using electric power of a battery;
   a condenser for condensing the refrigerant from the electrical compressor by radiating heat of the refrigerant;
   an expansion valve for expanding the refrigerant from the condenser;
   an evaporator for vaporizing the refrigerant by absorbing heat from outside the vehicle; and
   a blower unit for blowing air refrigerated around the evaporator into a target space.

9. A hybrid air conditioning system of a direct coupled motor driven hybrid electric vehicle comprising:
   an operating condition detector for detecting at least one operating condition of the hybrid air conditioning system;
   an electric air conditioner driven by electric power of a battery, and a mechanical air conditioner driven by an engine; and
   a control unit for controlling the hybrid air conditioning system based on at least one operating condition inputted from the operating condition detector;
   wherein the control unit is programmed to perform a method for controlling a hybrid air conditioning system, the method comprising:
      detecting operating conditions of the hybrid air conditioning system; and controlling a mechanical air conditioner and an electric air conditioner of the hybrid air conditioning system based on the detected operating conditions;
   wherein said detecting operating conditions of the air conditions system includes:
      detecting an on/off state of an air conditioning system switch;
      calculating a temperature difference between a detected interior temperature and a target temperature when the air conditioning system switch is on; and
      detecting an operating condition of the vehicle; and
   wherein said detecting an operating condition of the vehicle includes:
      determining whether or not the engine is in an idle stop state; and
      determining whether or not a state-of-charge of a battery is greater than a predetermined value when the engine is in the idle stop state, and
   wherein said controlling a mechanical air conditioner and an electric air conditioner of the hybrid air conditioning system includes stopping operation of the mechanical air conditioner when the state-of-charge of the battery is greater than the predetermined value and starting operation of the electric air conditioner when a refrigerant temperature in an evaporator of the electric air conditioner is greater than a predetermined temperature.

10. A hybrid air conditioning system of a direct coupled motor driven hybrid electric vehicle comprising:
    an operating condition detector for detecting at least one operating condition of the hybrid air conditioning system;
    an electric air conditioner driven by electric power of a battery, and a mechanical air conditioner driven by an engine; and
    a control unit for controlling the hybrid air conditioning system based on at least one operating condition inputted from the operating condition detector;
    wherein the control unit is programmed to perform a method for controlling a hybrid air conditioning system, the method comprising:
       detecting operating conditions of the hybrid air conditioning system; and
       controlling a mechanical air conditioner and an electric air conditioner of the hybrid air conditioning system based on the detected operating conditions;
    wherein said detecting operating conditions of the air conditions system includes:
       detecting an on/off state of an air conditioning system switch;
       calculating a temperature difference between a detected interior temperature and a target temperature when the air conditioning system switch is on; and detecting an operating condition of the vehicle; and
    wherein said detecting an operating condition of the vehicle includes:
       determining whether or not the engine is in an idle stop state;
       determining whether or not a state-of-charge of a battery is greater than a predetermined value when the engine is in the idle stop state; and
       restarting the engine when the state-of-charge of the battery is below the predetermined value, and
    wherein said controlling a mechanical air conditioner and an electric air conditioner of the air conditioning system includes:
       stopping operation of the mechanical air conditioner when the vehicle suddenly accelerates and starting operation of the electric air conditioner when a refrigerant temperature in an evaporator of the electric air conditioner is greater than a predetermined temperature.

11. A hybrid air conditioning system of a direct coupled motor driven hybrid electric vehicle comprising:
    an operating condition detector for detecting at least one operating condition of the hybrid air conditioning system;
    an electric air conditioner driven by electric power of a battery, and a mechanical air conditioner driven by an engine; and
    a control unit for controlling the hybrid air conditioning system based on at least one operating condition inputted from the operating condition detector;
    wherein the control unit is programmed to perform a method for controlling a hybrid air conditioning system, the method comprising:
       detecting operating conditions of the hybrid air conditioning system; and controlling a mechanical air conditioner and an electric air conditioner of the hybrid air conditioning system based on the detected operating conditions;

wherein said detecting operating conditions of the air conditions system includes:
  detecting an on/off state of an air conditioning system switch;
  calculating a temperature difference between a detected interior temperature and a target temperature when the air conditioning system switch is on; and
  detecting an operating condition of the vehicle; and wherein said detecting an operating condition of the vehicle includes:
  determining whether or not the engine is in an idle stop state; and
  determining whether or not the vehicle suddenly accelerates when the engine is not in the idle stop state, and wherein said controlling a mechanical air conditioner and an electric air conditioner of the air conditioning system includes:
  stopping operation of a mechanical air conditioner and starting operation of the electric air conditioner if a refrigerant temperature in an evaporator of the electric air conditioner is greater than a predetermined temperature, when the vehicle suddenly accelerates.

12. A hybrid air conditioning system of a direct coupled motor driven hybrid electric vehicle comprising:
  an operating condition detector for detecting at least one operating condition of the hybrid air conditioning system;
  an electric air conditioner driven by electric power of a battery, and a mechanical air conditioner driven by an engine; and
  a control unit for controlling the hybrid air conditioning system based on at least one operating condition inputted from the operating condition detector;
  wherein the control unit is programmed to perform a method for controlling a hybrid air conditioning system, the method comprising:
    detecting operating conditions of the hybrid air conditioning system; and
    controlling a mechanical air conditioner and an electric air conditioner of the hybrid air conditioning system based on the detected operating conditions;
  wherein said detecting operating conditions of the air conditions system includes:
    detecting an on/off state of an air conditioning system switch;
    calculating a temperature difference between a detected interior temperature and a target temperature when the air conditioning system switch is on; and
    detecting an operating condition of the vehicle; and
  wherein said detecting an operating condition of the vehicle includes:
    determining whether or not the engine is in an idle stop state; and
    determining whether or not the vehicle suddenly accelerates when the engine is not in the idle stop state, and
  wherein said controlling a mechanical air conditioner and an electric air conditioner of the air conditioning system includes:
    starting operation of the mechanical air conditioner when a refrigerant temperature in an evaporator of the mechanical air conditioner is greater than a predetermined temperature and starting operation of the electrical air conditioner when a refrigerant temperature in an evaporator of the electric air conditioner is greater than a predetermined temperature, in the case that the vehicle is not suddenly accelerating.

13. A hybrid air conditioning system of a direct coupled motor driven hybrid electric vehicle comprising:
  an operating condition detector for detecting at least one operating condition of the hybrid air conditioning system;
  an electric air conditioner driven by electric power of a battery, and a mechanical air conditioner driven by an engine; and
  a control unit for controlling the hybrid air conditioning system based on at least one operating condition inputted from the operating condition detector;
  wherein the control unit is programmed to perform a method for controlling a hybrid air conditioning system, the method comprising:
    detecting operating conditions of the hybrid air conditioning system; and
    controlling a mechanical air conditioner and an electric air conditioner of the hybrid air conditioning system based on the detected operating conditions;
  wherein said detecting operating conditions of the air conditions system includes:
    detecting an on/off state of an air conditioning system switch;
    calculating a temperature difference between a detected interior temperature and a target temperature when the air conditioning system switch is on; and
    detecting an operating condition of the vehicle; and
  wherein said detecting an operating condition of the vehicle includes:
    determining whether or not the engine is an idle stop state;
    determining whether or not a state-of-charge of a battery is greater than a predetermined value when the engine is in the idle stop state;
    restarting the engine when the state-of-charge of the battery is below the predetermined value; and
    determining whether or not the vehicle suddenly accelerates, when the engine is restarted, and
  wherein said controlling a mechanical air conditioner and an electric air conditioner of the hybrid air conditioning system includes:
    starting operation of the mechanical air conditioner when a refrigerant temperature in an evaporator of the mechanical air conditioner is greater than a predetermined temperature, and starting operation of the electrical air conditioner when a refrigerant temperature in an evaporator of the electric air conditioner is greater than a predetermined temperature, in the case that the vehicle suddenly accelerates.

14. A method for controlling a hybrid air conditioning system of a direct coupled motor driven hybrid electric vehicle, comprising:
  detecting operating conditions of the hybrid air conditioning system; and
  controlling the hybrid air conditioning system including a mechanical air conditioner driven by an engine and an electric air conditioner driven by electric power of a battery;
  wherein said detecting operating conditions of the air conditioning system includes detecting an on/off state of an air conditioning system switch;

calculating a temperature difference between a detected interior temperature and a target temperature if the air conditioning system switch is on; and detecting an operating condition of the vehicle;

wherein said detecting an operating condition of the vehicle includes:

determining whether or not the engine is in an idle stop state; and determining whether or not a state-of-charge of a battery is greater than a predetermined value when the engine is in the idle stop state;

restarting the engine when the state-of-charge of the battery is below the predetermined value;

determining whether or not the vehicle suddenly accelerates when the engine is not in the state of idle stop;

restarting the engine when the state-of-charge of the battery is below the predetermined value; and determining whether or not the vehicle is suddenly accelerating when the engine is restarted;

wherein said controlling the hybrid air conditioning system includes:

stopping operation of the mechanical air conditioner when the state-of-charge of the battery is greater than a predetermined value and starting operation of the electric air conditioner when a refrigerant temperature in an evaporator of the electric air conditioner is greater than a predetermined temperature;

stopping operation of the mechanical air conditioner when the vehicle suddenly accelerates and starting operation of the electric air conditioner when a refrigerant temperature in an evaporator of the electric air conditioner is greater than a predetermined temperature;

stopping operation of a mechanical air conditioner and starting operation of the electric air conditioner if a refrigerant temperature in an evaporator of the electric air conditioner is greater than a predetermined temperature, when the vehicle is in the state of sudden acceleration;

starting operation of the mechanical air conditioner when a refrigerant temperature in an evaporator of the mechanical air conditioner is greater than a predetermined temperature, and starting operation of the electrical air conditioner when a refrigerant temperature in an evaporator of the electric air conditioner is greater than a predetermined temperature, where the vehicle is not suddenly accelerating;

starting operation of the mechanical air conditioner when a refrigerant temperature in an evaporator of the mechanical air conditioner is greater than a predetermined temperature and starting operation of the electrical air conditioner when a refrigerant temperature in an evaporator of the electric air conditioner is greater than a predetermined temperature, where the vehicle is suddenly accelerating.

15. A hybrid air conditioning system of a direct coupled motor driven hybrid electric vehicle comprising:

an operating condition detector for detecting at least one operating condition of the hybrid air conditioning system;

an electric air conditioner driven by electric power of a battery, and a mechanical air conditioner driven by an engine; and a control unit for controlling the hybrid air conditioning system based on at least one operating condition inputted from the operating condition detector;

wherein the control unit is programmed to perform a method for controlling a hybrid air conditioning system, the method comprising:

detecting operating conditions of the hybrid air conditioning system; and controlling a mechanical air conditioner and an electric air conditioner of the hybrid air conditioning system based on the detected operating conditions;

wherein said detecting operating conditions of the air conditions system includes:

detecting an on/off state of an air conditioning system switch;

calculating a temperature difference between a detected interior temperature and a target temperature when the air conditioning system switch is on; and detecting an operating condition of the vehicle; and wherein said detecting an operating condition of the vehicle includes:

determining whether or not the engine is in an idle stop state; and determining whether or not a state-of-charge of a battery is greater than a predetermined value when the engine is in the idle stop state;

restarting the engine when the state-of-charge of the battery is below the predetermined value;

determining whether or not the vehicle suddenly accelerates when the engine is not in the idle stop state;

restarting the engine when the state-of-charge of the battery is below the predetermined value;

determining whether or not the vehicle suddenly accelerates, when the engine is restarted; and wherein said controlling a mechanical air conditioner and an electric air conditioner of the hybrid air conditioning system includes:

stopping operation of the mechanical air conditioner when the state-of-charge of the battery is greater than the predetermined value and starting operation of the electric air conditioner when a refrigerant temperature in an evaporator of the electric air conditioner is greater than a predetermined temperature;

stopping operation of the mechanical air conditioner when the vehicle suddenly accelerates and starting operation of the electric air conditioner when a refrigerant temperature in an evaporator of the electric air conditioner is greater than a predetermined temperature;

stopping operation of a mechanical air conditioner and starting operation of the electric air conditioner if a refrigerant temperature in an evaporator of the electric air conditioner is greater than a predetermined temperature, when the vehicle suddenly accelerates;

starting operation of the mechanical air conditioner when a refrigerant temperature in an evaporator of the mechanical air conditioner is greater than a predetermined temperature and starting operation of the electrical air conditioner when a refrigerant temperature in an evaporator of the electric air conditioner is greater than a predetermined temperature, in the case that the vehicle is not suddenly accelerating; and starting operation of the mechanical air conditioner when a refrigerant temperature in an evaporator of the mechanical air conditioner is greater than a predetermined temperature, and starting operation of the electrical air conditioner when a refrigerant temperature in an evaporator of the electric air conditioner is greater than a predetermined temperature, in the case that the vehicle suddenly accelerates.

* * * * *